(12) United States Patent
Kim

(10) Patent No.: US 8,886,969 B2
(45) Date of Patent: Nov. 11, 2014

(54) INPUT/OUTPUT DEVICE POWER REDUCTION AND OPTIMIZATION BY ENABLEMENT OR DISABLEMENT OF AN EXTERNAL CIRCUIT COUPLED TO THE INPUT/OUTPUT DEVICE

(76) Inventor: Moon J. Kim, Wappingers Falls, NY (US)

( * ) Notice: Subject to any disclaimer, the term of this patent is extended or adjusted under 35 U.S.C. 154(b) by 284 days.

(21) Appl. No.: 13/304,898

(22) Filed: Nov. 28, 2011

(65) Prior Publication Data
US 2013/0138976 A1    May 30, 2013

(51) Int. Cl.
*G06F 1/00*    (2006.01)
*G06F 1/32*    (2006.01)

(52) U.S. Cl.
CPC ..................... *G06F 1/3203* (2013.01)
USPC ......................................................... 713/300

(58) Field of Classification Search
CPC ..................................................... G06F 1/3203
See application file for complete search history.

(56) References Cited

U.S. PATENT DOCUMENTS

| | | | |
|---|---|---|---|
| 2008/0155280 A1* | 6/2008 | Hacking et al. | 713/300 |
| 2008/0172565 A1* | 7/2008 | Chu et al. | 713/300 |
| 2008/0229130 A1* | 9/2008 | Guan et al. | 713/323 |
| 2012/0079290 A1* | 3/2012 | Kumar et al. | 713/300 |

* cited by examiner

*Primary Examiner* — Thomas Lee
*Assistant Examiner* — Gayathri Sampath
(74) *Attorney, Agent, or Firm* — Hunter E. Webb; Keohane & D'Alessandro PLLC

(57) ABSTRACT

Embodiments of the present invention provide a processor design that enables controller and I/O device power reduction and optimization. In a typical embodiment, a processing core is coupled to a set (e.g., three) of I/O blocks. The processing core provides for selective activation and/or deactivation of any of the I/O blocks. Two of the I/O blocks are coupled to individual voltage I/O components as well as individual external circuits. In one embodiment, the individual external circuits are coupled to individual voltage control components.

11 Claims, 5 Drawing Sheets

INPUT/OUTPUT DEVICE POWER REDUCTION AND OPTIMIZATION BY ENABLEMENT OR DISABLEMENT OF AN EXTERNAL CIRCUIT COUPLED TO THE INPUT/OUTPUT DEVICE

FIELD OF THE INVENTION

In general, embodiments of the present invention relate to a processor design. Specifically, embodiments of the present invention relate to a processor design that provides controller and input/output (I/O) device power reduction and optimization.

BACKGROUND OF THE INVENTION

In generic micro-processor design, I/O blocks are typically supported with a separate supply voltage and the processor does not have a way to control I/O functionality. Even with an internal stand-by with I/O idling capabilities, voltage leakage is inevitable in the I/O block. This anomaly is amplified when a processor has many I/O blocks for an I/O intensive design. Many current products have this implementation, and, thus, power consumption cannot be well managed. That is, existing I/O blocks may consume up to 50% of the total power for an I/O intensive application. Moreover, processor I/O circuits may drain 25-50% of the total power in this design approach even when the system is in idle mode.

In view of the foregoing, there exists a need for an approach that overcomes at least one of the deficiencies in the existing art.

SUMMARY OF THE INVENTION

In general, embodiments of the present invention provide a processor design that provides controller and I/O device power reduction and optimization. In a typical embodiment, a processing core is coupled to a set (e.g., three) of I/O blocks. The processing core provides for selective activation and/or deactivation of any of the I/O blocks. Two of the I/O blocks are themselves coupled to individual voltage I/O components as well as individual external circuits. In one embodiment, the individual external circuits are themselves coupled to individual voltage control components. Among other things, the processor design disclosed herein provides: a power-down of the I/O supply to a sleep mode; a robust power saving strategy; adjustment of the I/O supply to achieve specific power-performance optimization; enablement of control to I/O-attached circuits; external circuit operating condition control to the I/O-attached circuit; control of the I/O-attached circuits' power supply voltage; and/or a combination of power-saving methods to achieve power-performance optimization in real time.

A first aspect of the present invention provides a processor, comprising: a processing core; a set of input/output (I/O) blocks coupled to the processing core, the set of I/O blocks being selectively activated and deactivated by the processing core; and a set of voltage I/O components coupled to the set of I/O blocks for providing power-performance optimization when the set of I/O blocks are activated.

A second aspect of the present invention provides a processor, comprising: a processing core; a first input/output (I/O) block coupled to the processing core; a second I/O block coupled to the processing core; a third I/O block coupled to the processing core, wherein the first I/O block, the second I/O block, and the third I/O block being selectively activated and deactivated by the processing core; a first voltage I/O component coupled to the second I/O block; and a second voltage I/O component coupled to the third I/O block, wherein the first voltage I/O component and the second voltage I/O component provide power-performance optimization when any of the first I/O block, the second I/O block, and the third I/O block are activated.

A third aspect of the present invention provides a method for forming a processor, comprising: coupling a set of input/output (I/O) blocks to a processing core, the set of I/O blocks being selectively activated and deactivated by the processing core; and coupling a set of voltage I/O components to the set of I/O blocks for providing power-performance optimization when the set of I/O blocks are activated.

BRIEF DESCRIPTION OF THE DRAWINGS

These and other features of this invention will be more readily understood from the following detailed description of the various aspects of the invention taken in conjunction with the accompanying drawings in which.

Figure 1:
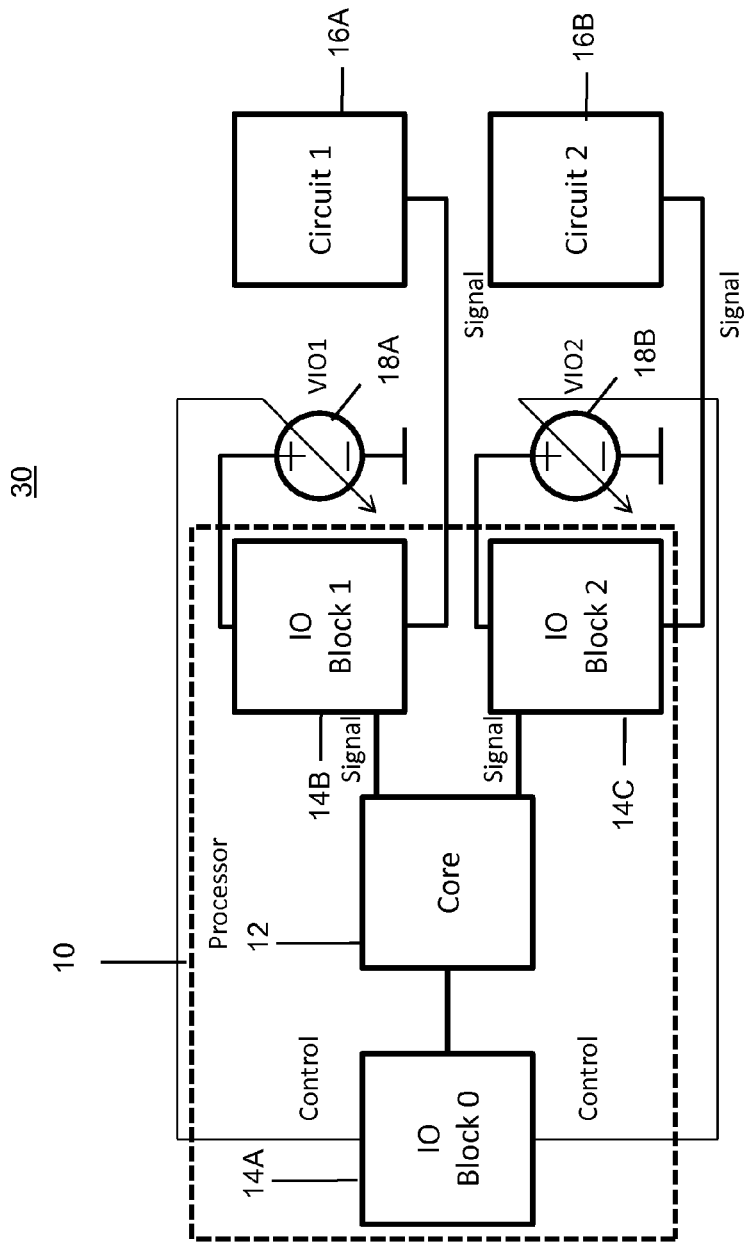
FIG. 1 depicts a processor design according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide a processor design that provides controller and I/O device power reduction and optimization. In a typical embodiment, a processing core is coupled to a set (e.g., three) of I/O blocks. The processing core provides for selective activation and/or deactivation of any of the I/O blocks. Two of the I/O blocks are themselves coupled to individual voltage I/O components as well as individual external circuits. In one embodiment, the individual external circuits are themselves coupled to individual voltage control components. Among other things, the processor design disclosed herein provides: a power-down of the I/O supply to a sleep mode; a robust power saving strategy; adjustment of the I/O supply to achieve specific power-performance optimization; enablement of control to I/O-attached circuits; external circuit operating condition control to the I/O-attached circuit; control of the I/O-attached circuits' power supply voltage; and/or a combination of power-saving methods to achieve power-performance optimization in real time.

Referring now to FIG. 1, a processor design 30 according to an embodiment of the present invention is shown. As depicted, a processing core 12 is coupled to input/output (I/O) blocks 14A-C. Voltage I/O components 18A-B are coupled to I/O blocks 14B-C, respectively. In addition, external circuits 16A-B are coupled to I/O blocks 14B-C, respectively. As shown, voltage I/O control signals are transmitted between I/O block 14A and voltage I/O components 18A-B. Similarly, processing signals are transmitted between processing core 12 and I/O blocks 14B-C, as well as between I/O blocks 14B-C and external circuits 16A-B.

As shown in FIG. 1, external power supplies are controlled by separate voltage I/O components 18A-B. I/O blocks' 14A-C power may be selectively turned on/off by processing core 12. Voltage levels may be reconfigured in real-time for desired I/O properties. External circuits 16A-B can be put into a sleep mode before I/Os are shutdown. Moreover, external circuits 16A-B maintain status and information during shutdown. In one embodiment, I/O blocks' 14A-C wake utilizes a special procedure and delay depending on the micro processor design. Specific power-performance optimization can be achieved by adjusting voltage I/O components 18A-B when I/O blocks 14A-C are powered on. Still yet, design 30 may utilize a higher data bandwidth to overcome the chip hardware process variation.

Figure 2:
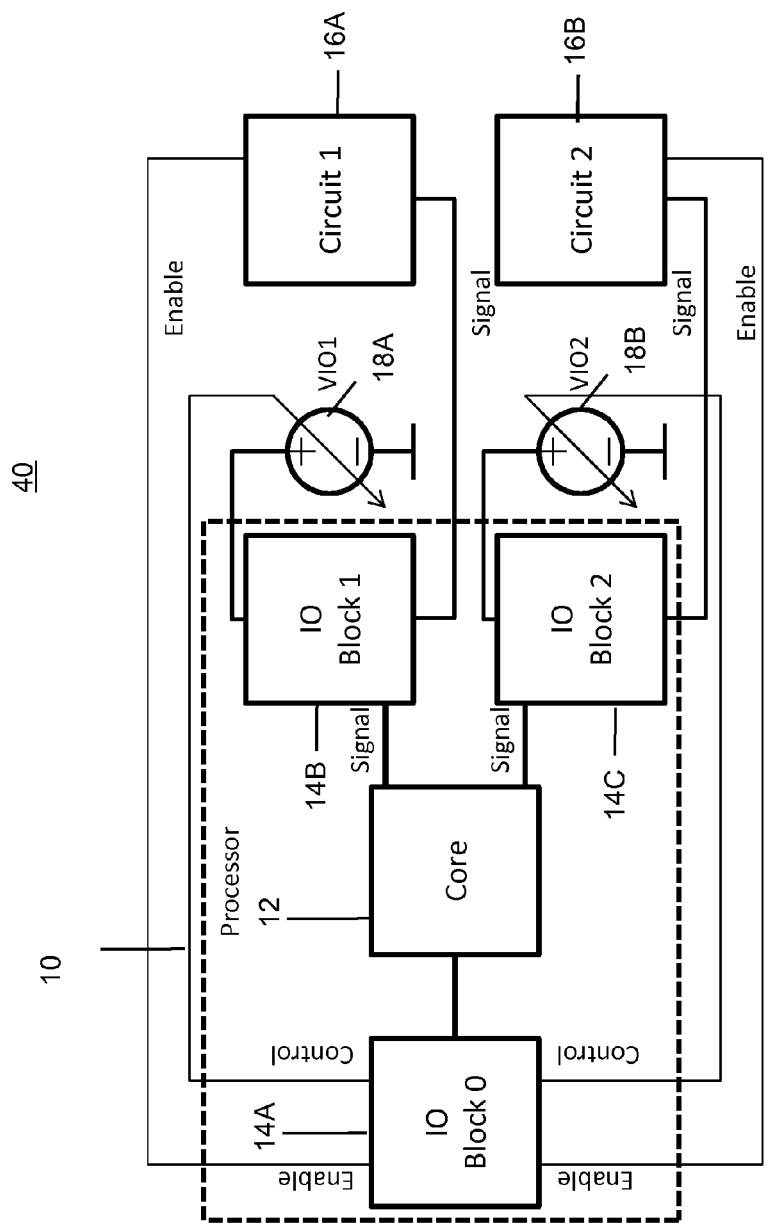
FIG. 2 depicts another processor design according to an embodiment of the present invention.

Referring now to FIG. 2, another processor design 40 according to an embodiment of the present invention is shown. As depicted, a processing core 12 is coupled to input/output (I/O) blocks 14A-C. Voltage I/O components 18A-B are coupled to I/O blocks 14B-C, respectively. In addition, external circuits 16A-B are coupled to I/O blocks 14B-C, respectively. As shown, voltage I/O control signals are transmitted between I/O block 14A and voltage I/O components 18A-B. Similarly, processing signals are transmitted between processing core 12 and I/O blocks 14B-C, as well as between I/O blocks 14B-C and external circuits 16A-B. Still yet, enablement and/or disablement signals are transmitted between I/O block 14A and external circuits 16A-B.

It is understood that design 40 provides the various features and functions of design 30 of FIG. 1 with some additions. Specifically, enablement controls may be used to ensure external circuit 16A-B insensitivity during an I/O block 14A-C power-down process. Along these lines, enablement controls may be tri-state and may be shared with multiple I/O blocks 14A-C to ensure continuous disabling. Moreover, enablement controls can be pulled up or down by resistors to maintain level.

Figure 3:
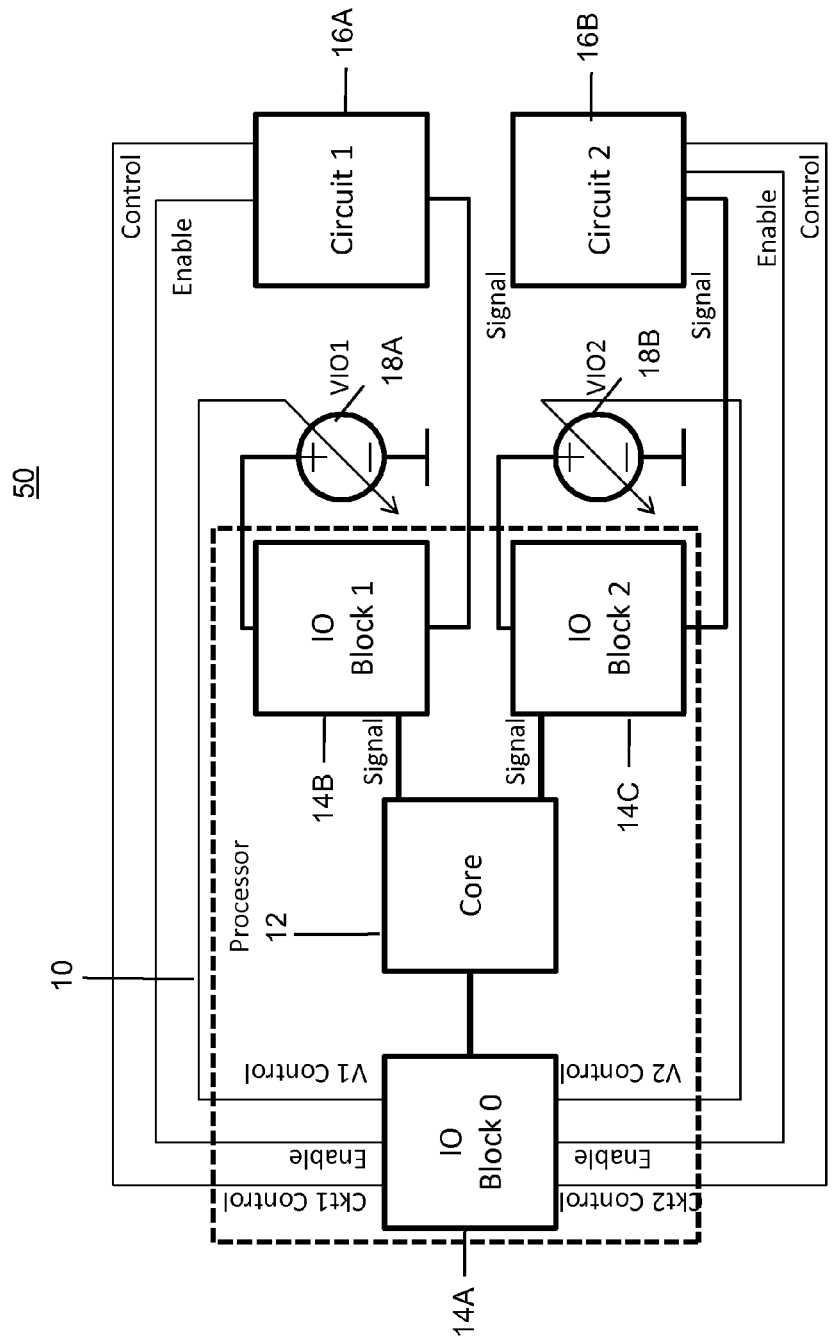
FIG. 3 depicts another processor design according to embodiment of the present invention.

Referring to FIG. 3, another processor design 50 according to an embodiment of the present invention is shown. As depicted, a processing core 12 is coupled to input/output (I/O) blocks 14A-C. Voltage I/O components 18A-B are coupled to I/O blocks 14B-C, respectively. In addition, external circuits 16A-B are coupled to I/O blocks 14B-C, respectively. As shown, voltage I/O control signals are transmitted between I/O block 14A and voltage I/O components 18A-B, while circuit control signals are transmitted between I/O block 14A and external circuits 16A-B. Similarly, processing signals are transmitted between processing core 12 and I/O blocks 14B-C, as well as between I/O blocks 14B-C and external circuits 16A-B. Still yet, enablement/disablement signals are transmitted between I/O block 14A and external circuits 16A-B.

Figure 4:
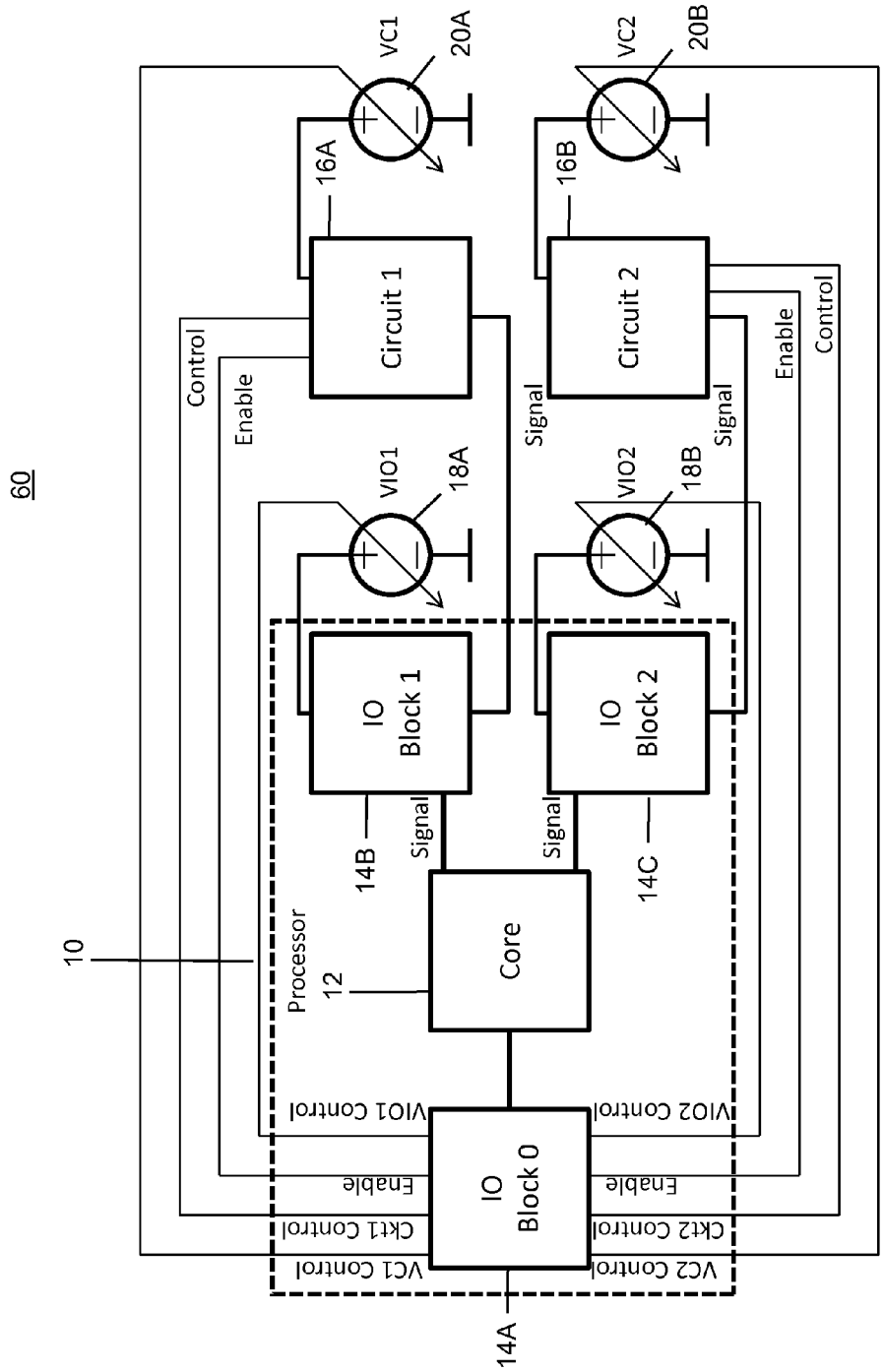
FIG. 4 depicts another processor design according to embodiment of the present invention.

It is understood that design 50 may provide some or all of the features and functions of designs 30 and 40 of FIGS. 1 and 2 with some additions. For example, processor 10 may implement a control method over the connected external circuits' 16A-B status controls. Processor 10 also places external circuits 16A-B into a lower throughput and power consumption mode when I/O demand is low. Still yet, processor 10 may place external circuits 16A-B on stand-by or sleep mode before it shuts down the corresponding I/O block. Under design 50, the control aspect includes circuit internal setup, which can be manipulated through signal and external setups that cannot be managed through software Referring to FIG. 4, another processor design 60 according to an embodiment of the present invention is shown. As depicted, a processing core 12 is coupled to input/output (I/O) blocks 14A-C. Voltage I/O components 18A-B are coupled to I/O blocks 14B-C, respectively. In addition, external circuits 16A-B are coupled to I/O blocks 14B-C and voltage control components 20A-B, respectively. As shown, voltage I/O control signals are transmitted between I/O block 14A and voltage I/O components 18A-B, while circuit control signals are transmitted between I/O block 14A and external circuits 16A-B. Moreover, voltage control component signals are transmitted between I/O block 14A and voltage control components 20A-B. In addition, processing signals are transmitted between processing core 12 and I/O blocks 14B-C, as well as between I/O blocks 14B-C and external circuits 16A-B. Still yet, enablement/disablement signals are transmitted between I/O block 14A and external circuits 16A-B.

Figure 5:
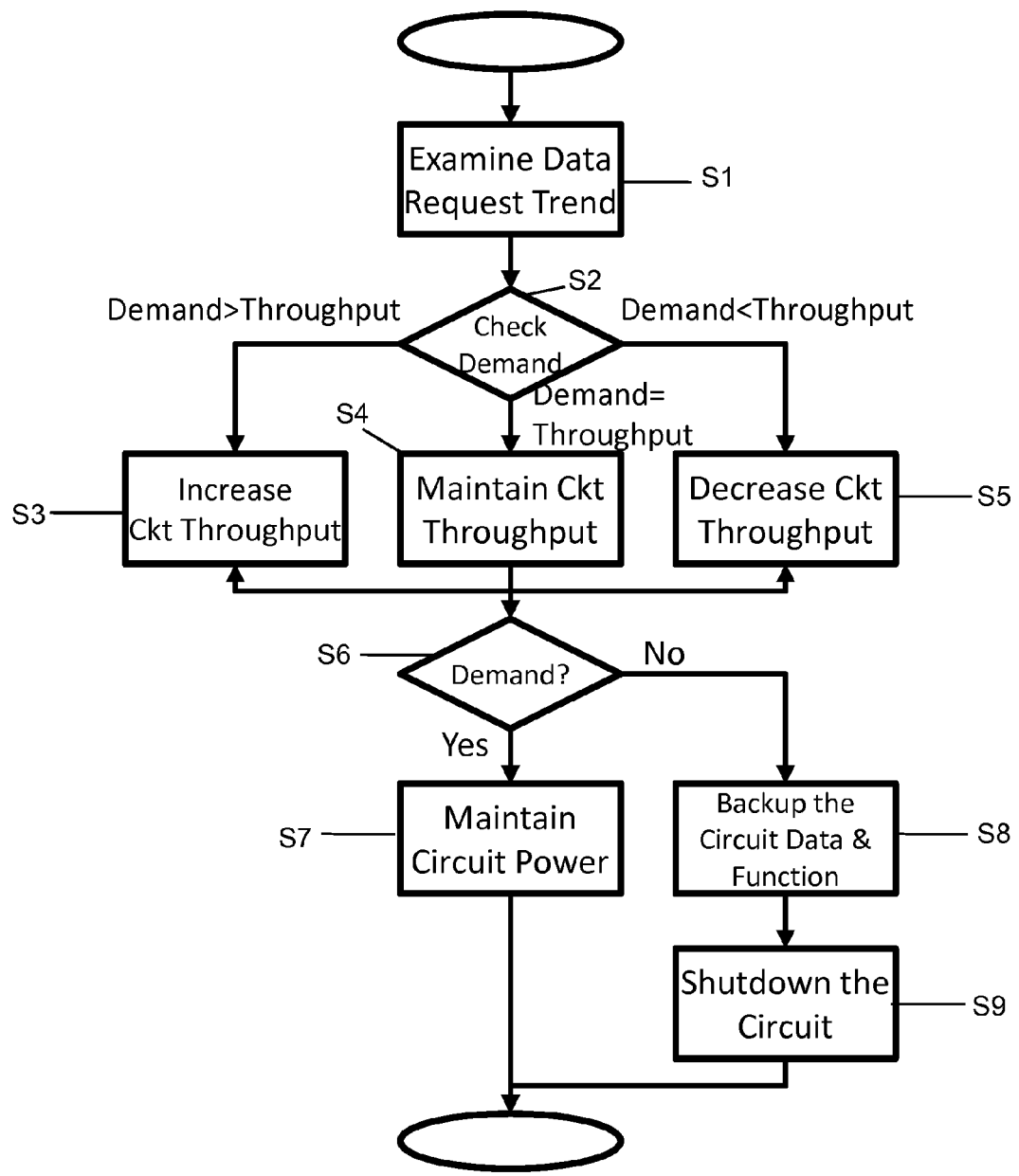
FIG. 5 depicts a method flow diagram according to an embodiment of the present invention.

It is understood that design 60 may provide some or all of the features and functions of designs 30, 40, and 50 of FIGS. 1-3 with some additions. For example, processor 10 controls the power supply voltage of external circuits 16A-B. When necessary, processor 10 moves data from external circuits 16A-B to other location, and shuts down the circuit's 16A-B power supply and the corresponding I/O power supply. In addition, circuit supply voltage can be adjusted to achieve different level of performance in the circuit Referring now to FIG. 5, a method flow diagram according to an embodiment of the present invention is shown. It is understood in advance that under the control method of FIG. 5, attached circuit operation modes are controlled depending on the data demand in the processor. In addition, when there is no demand, or the demand is lower than the benefit of the circuit power, the circuit data and function are backed up to other units to shut down the circuit. In any event, in step S1, a data request trend is examined. In step S2, a demand is checked against throughput. If demand is greater than throughput, circuit throughput is increased in step S3 and the demand is checked once again in step S2. If demand is less than throughput, circuit throughput is decreased in step S5 and the demand is checked once again in step S2. Once demand equals throughput (or close thereto), circuit throughput is maintained in step S4, and it is determined in step S6 whether a demand for the circuit (or underlying data) still exists. If so, circuit power is maintained in step S7, If not, circuit data and function are backed up in step S8, and the circuit is shut down in step S9.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A processor, comprising:
   a processing core;
   a set of input/output (I/O) blocks coupled to the processing core that perform I/O functions for the processing core, the set of I/O blocks comprising a first I/O block, a second I/O block, and a third I/O block, the set of I/O blocks being selectively activated and deactivated by the processing core, the processing core executing instructions to perform basic operations of the processor;
   a set of external circuits coupled to the set of I/O blocks, the set of external circuits comprising a first external circuit and a second external circuit, the first external circuit and the second external circuit each receiving an enablement signal and a control signal from the first I/O block; and
   a set of voltage I/O components coupled to the set of I/O blocks for providing power-performance optimization when the set of I/O blocks are activated.

2. The processor of claim 1, the set of voltage I/O components comprising a voltage first I/O component, and a voltage second I/O component.

3. The processor of claim 2, the voltage first I/O component being coupled to the second I/O block, and the voltage second I/O component being coupled to the third I/O block.

4. The processor of claim 1, the first external circuit being coupled to the second I/O block, and the second external circuit being coupled to the third I/O block.

5. The processor of claim 1, further comprising a first voltage control component coupled to the first external circuit, and a second voltage control component coupled to the second external circuit.

6. A processor, comprising:
   a processing core, the processing core executing instructions to perform basic operations of the processor;
   a first input/output (I/O) block coupled to the processing core;
   a second I/O block coupled to the processing core;
   a first external circuit coupled to the second I/O block;
   a first voltage control component coupled to the first external circuit;
   a third I/O block coupled to the processing core, wherein the first I/O block, the second I/O block, and the third I/O block performing I/O functions for the processing core and are selectively activated and deactivated by the processing core;
   a second external circuit coupled to the third I/O block;
   a second voltage control component coupled to the second external circuit;
   a first voltage I/O component coupled to the second I/O block; and
   a second voltage I/O component coupled to the third I/O block, wherein the first voltage I/O component and the second voltage I/O component provide power-performance optimization when any of the first I/O block, the second I/O block, and the third I/O block are activated.

7. A method for forming a processor, comprising:
   coupling a set of input/output (I/O) blocks to a processing core, the set of I/O blocks comprising a first I/O block, a second I/O block, and a third I/O block, the set of I/O blocks performing I/O functions for the processing core and being selectively activated and deactivated by the processing core, the processing core executing instructions to perform basic operations of the processor;
   coupling a set of external circuits to the set of I/O blocks, the set of external circuits comprising a first external circuit, and a second external circuit, the first external circuit and the second external circuit each receiving an enablement signal and a control signal from the first I/O block;
   coupling a set of voltage I/O components to the set of I/O blocks for providing power-performance optimization when the set of I/O blocks are activated.

8. The method of claim 7, the set of voltage I/O components comprising a voltage first I/O component, and a voltage second I/O component.

9. The method of claim 8, further comprising coupling the voltage first I/O component to the second I/O block, and coupling the voltage second I/O component to the third I/O block.

10. The method of claim 7, the first external circuit being coupled to the second I/O block, and the second external circuit being coupled to the third I/O block.

11. The method of claim 7, further comprising:
    coupling a first voltage control component to the first external circuit; and
    coupling a second voltage control component to the second external circuit.

* * * * *

UNITED STATES PATENT AND TRADEMARK OFFICE
CERTIFICATE OF CORRECTION

Page 1 of 1

PATENT NO. : 8,886,969 B2
APPLICATION NO. : 13/304898
DATED : November 11, 2014
INVENTOR(S) : Kim It is certified that error appears in the above-identified patent and that said Letters Patent is hereby corrected as shown below:

In the specification

Column 4, Line 26, after "software", please insert -- . --; and

Column 4, Line 52, after "circuit", please insert -- . --.

Signed and Sealed this
Twenty-fourth Day of March, 2015

Michelle K. Lee
*Director of the United States Patent and Trademark Office*